(12) United States Patent
Sanson et al.

(10) Patent No.: US 12,377,875 B2
(45) Date of Patent: Aug. 5, 2025

(54) EGO MOTION ESTIMATION ON SENSOR IN AMBIGUOUS VELOCITY ENVIRONMENT

(71) Applicant: GM Cruise Holdings LLC, San Francisco, CA (US)

(72) Inventors: Jessica Bartholdy Sanson, Munich (DE); Kalin Hristov Kabakchiev, Munich (DE); Stefan Andreas Brisken, Munich (DE); Andre Giere, Oberpframmern (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 279 days.

(21) Appl. No.: 18/305,647

(22) Filed: Apr. 24, 2023

(65) Prior Publication Data

US 2024/0351608 A1 Oct. 24, 2024

(30) Foreign Application Priority Data

Apr. 24, 2023 (EP) ..................................... 23169365

(51) Int. Cl.
*B60W 60/00* (2020.01)
*B60W 40/10* (2012.01)

(52) U.S. Cl.
CPC .......... *B60W 60/001* (2020.02); *B60W 40/10* (2013.01); *B60W 2420/408* (2024.01)

(58) Field of Classification Search
CPC ............... B60W 60/001; B60W 40/10; B60W 2420/408

USPC .......................................................... 701/23
See application file for complete search history.

(56) References Cited

U.S. PATENT DOCUMENTS

| | | | |
|---|---|---|---|
| 10,962,638 B2* | 3/2021 | Duque Biarge | ........ G06T 17/05 |
| 12,130,353 B2* | 10/2024 | Lessmann | ............... G01S 7/356 |
| 12,248,053 B2* | 3/2025 | Lessmann | ............... G01S 13/60 |
| 2019/0346561 A1 | 11/2019 | Hofman | |
| 2020/0003886 A1 | 1/2020 | Cho et al. | |
| 2023/0333252 A1* | 10/2023 | Pazhayampallil | .. B60W 30/146 |
| 2024/0077617 A1* | 3/2024 | Lawson | ................ G01S 13/584 |

OTHER PUBLICATIONS

"Extended European Search Report for European Patent Application No. 23169365.6", Mailed Date: Oct. 25, 2023, 10 pages.

* cited by examiner

*Primary Examiner* — Andrew Joseph Rudy
(74) *Attorney, Agent, or Firm* — CANTOR COLBURN LLP

(57) ABSTRACT

Various technologies described herein pertain to a radar sensor system that performs ego motion estimation. A radar sensor system can be utilized to generate an instantaneous three-dimensional ego motion estimate of a vehicle. The radar sensor system employs an algorithm that enables generating ego motion estimates for velocities of the vehicle that can be greater than, less then, or equal to the unambiguous maximum velocity of the radar sensor system. Moreover, a single radar sensor system of a vehicle can implement the approaches set forth herein and the techniques can be applicable regardless of modulation of the radar sensor system.

20 Claims, 10 Drawing Sheets

EGO MOTION ESTIMATION ON SENSOR IN AMBIGUOUS VELOCITY ENVIRONMENT

RELATED APPLICATION

This application claims priority to European Patent Application No. 23169365.6, filed on Apr. 24, 2023, and entitled "EGO MOTION ESTIMATION ON SENSOR IN AMBIGUOUS VELOCITY ENVIRONMENT". The entirety of this application is incorporated herein by reference.

BACKGROUND

In the automotive sector, it is often desired for a vehicle to estimate its own motion. Estimation of motion of a vehicle by the vehicle (e.g., by a sensor system of the vehicle) can be referred to as ego motion estimation. Ego motion estimation is commonly performed using a differential Global Positioning System (D-GPS) of the vehicle. However, high precision D-GPS can have significant accuracy limitations in various scenarios. For instance, accuracy of D-GPS can be detrimentally impacted by buildings in dense urban areas.

Another conventional approach employed for ego motion estimation uses wheel velocity sensors that estimate speed of the vehicle based on rotational velocity of the wheels of the vehicle. Generally, wheel velocity sensors can provide accurate speed estimates; however, such sensors can provide inaccurate speed information in the event of slippage. For instance, if a tire of the vehicle loses traction (e.g., due to ice on a roadway), the wheel can rotate at an increased rotational velocity that does not correspond with an actual velocity of the vehicle, and thus, can output an inaccurate representation of an actual speed of the vehicle.

Moreover, another common approach for performing ego motion estimation uses a radar sensor system of the vehicle. However, in automotive radar sensor systems, an unambiguous maximum velocity (e.g., an unambiguously measurable maximum speed) of a radar sensor system of a vehicle may be lower than a velocity of the vehicle. Accordingly, this scenario can result in a maximum detectable velocity of the vehicle being limited based upon the unambiguous maximum velocity of the radar sensor system.

Inaccurate ego motion estimation can be particularly impactful in autonomous vehicles. An autonomous vehicle perceives objects surrounding the autonomous vehicle based upon the sensor signals generated by sensor systems of the autonomous vehicle to enable navigating a driving environment. For example, the autonomous vehicle may include various sensor systems, such as a radar sensor system, a camera sensor system and/or a lidar sensor system, for generating sensor signals. The autonomous vehicle also includes a centralized processing device that receives data based upon the sensor signals generated by the sensor systems and performs a variety of different tasks, such as detection of vehicles, pedestrians, and other objects. Based on an output of the processing device, the autonomous vehicle may perform a driving maneuver. Operation of the autonomous vehicle may be detrimentally impacted by inaccurate ego motion estimation.

SUMMARY

The following is a brief summary of subject matter that is described in greater detail herein. This summary is not intended to be limiting as to the scope of the claims.

Described herein are various technologies in which radar sensor systems perform ego motion estimation of a vehicle. A radar sensor system can be utilized to generate an instantaneous three-dimensional ego motion estimate of a vehicle. In contrast to conventional approaches that utilize radar sensor systems to estimate ego motion which are limited by the unambiguous maximum velocity of the radar sensor systems, the radar sensor system described herein employs an algorithm that enables generating ego motion estimates for velocities of the vehicle that can be several times the unambiguous maximum velocity of the radar sensor system. Moreover, a single radar sensor system of a vehicle can implement the approaches set forth herein and the techniques can be applicable regardless of modulation of the radar sensor system.

According to various embodiments, a radar sensor system can include a transmit antenna, a receive antenna, and radar processing circuitry, which can perform various acts. The transmit antenna can be configured to transmit a radar signal into an environment of the radar sensor system. Further, the receive antenna can be configured to receive a return signal from the environment of the radar sensor system responsive to the radar signal. The radar processing circuitry can generate a radar frame based on the return signal received from the environment. The radar frame can include detection points, where each of the detection points can have a radial velocity value and an azimuth angle value. Each of the detection points can also have an elevation angle value. The radar processing circuitry can concatenate the radar frame with at least one shifted radar frame to form a concatenated radar frame. The shifted radar frame can include detection points of the radar frame having respective radial velocity values shifted by a multiple of an unambiguous maximum velocity value of the radar sensor system. The radar processing circuitry can further define windows within the concatenated radar frame. Moreover, the radar processing circuitry can select respective groups of detection points within the windows identified as likely corresponding to one or more static objects in the environment. Potential ego motion estimations can be generated by the radar processing circuitry based on the groups of detection points within the windows. Moreover, one of the potential ego motion estimations can be selected by the radar processing circuitry as an ego motion estimation of the radar sensor system. For instance, the radar processing circuitry can generate the ego motion estimation based on a linear least squares—Moore-Penrose inverse estimation. The ego motion estimation can be outputted by the radar sensor system, employed by the radar sensor system for additional processing of radar data, or the like.

According to various embodiments, an autonomous vehicle can include the radar sensor system that generates the ego motion estimation as described herein. Pursuant to other embodiments, other types of vehicles other than an autonomous vehicle can include the radar sensor system described herein. In yet other embodiments, the radar sensor system can be a standalone device (e.g., separate from a vehicle).

The radar sensor system described herein can instantaneously estimate ego motion with three-dimensional components in ambiguous or non-ambiguous velocity environments. Moreover, the radar sensor system can generate the ego motion estimation based on detections that can come from a single radar frame and can provide high accuracy ego motion estimation.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
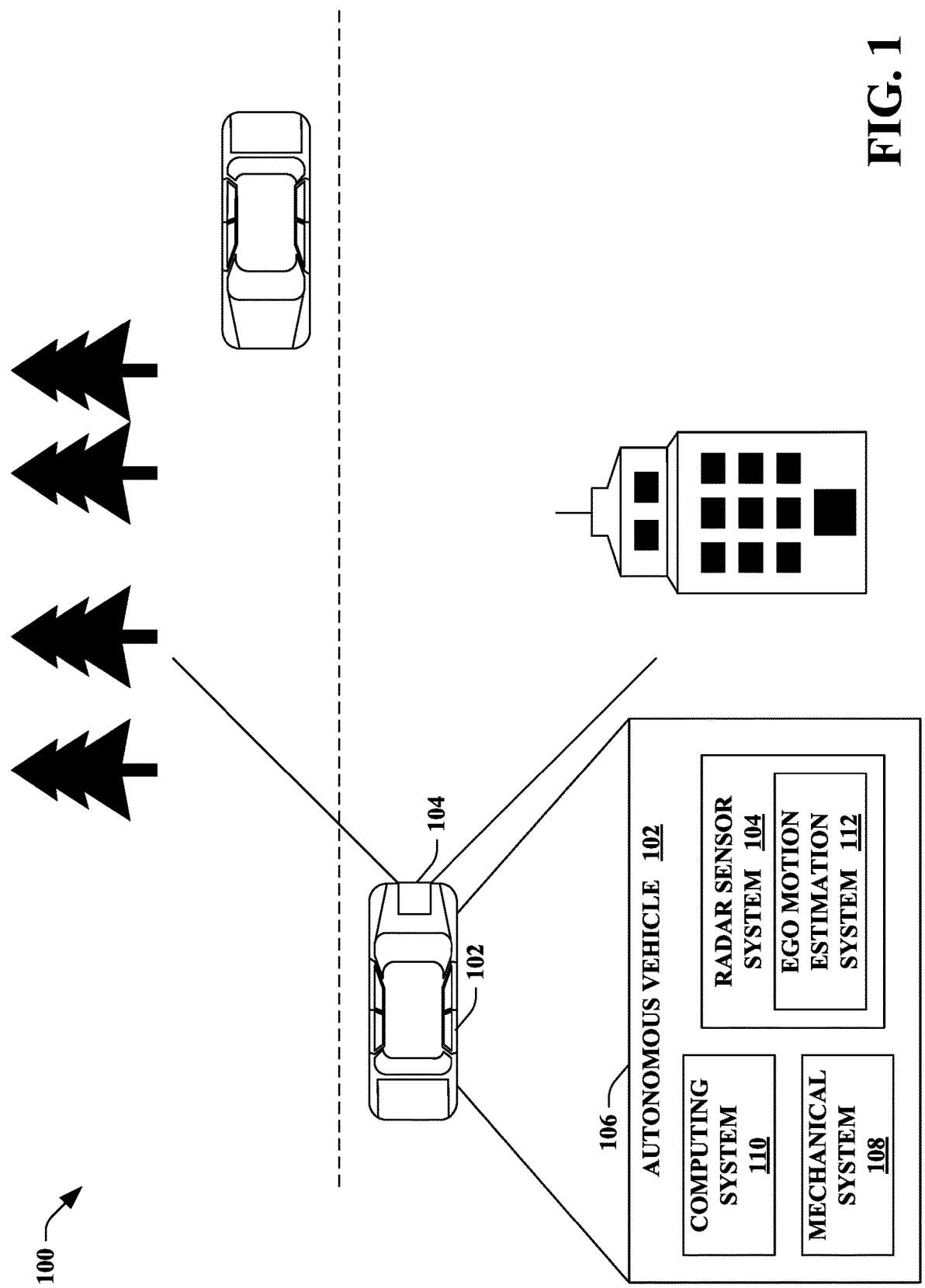
FIG. 1 illustrates an exemplary driving environment that includes an autonomous vehicle.

Various technologies pertaining to estimating ego motion using automotive radar sensor systems in ambiguous and non-ambiguous velocity environments are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Examples set forth herein pertain to an autonomous vehicle including a radar sensor system that estimates ego motion in ambiguous and non-ambiguous velocity environments. It is to be understood, however, that the radar sensor system described herein can be employed in a variety of different scenarios, such as flight, in drone technologies, in augmented reality (AR) or virtual reality (VR) technologies, in non-autonomous vehicles (e.g., in a fleet of non-autonomous vehicles), and so forth. Autonomous vehicles are set forth herein as one possible use case, and features of the claims are not to be limited to autonomous vehicles unless such claims explicitly recite an autonomous vehicle.

As described herein, the term "ego motion estimation" refers to estimation of motion of a sensor by the sensor itself. Thus, a radar sensor system can estimate its own motion. Moreover, if the radar sensor system is included as part of a vehicle (e.g., an autonomous vehicle), motion of the radar sensor system can correspond to (e.g., be the same as) motion of the vehicle that includes the radar sensor system; accordingly, the radar sensor system can estimate motion of the vehicle in which the radar sensor system is included. The term "ego motion estimation" can accordingly also refer to estimation of motion of a vehicle by a sensor included as part of that vehicle. The ego motion estimation can be a velocity (e.g., a three-dimensional velocity), a speed, an acceleration, a change in location, a combination thereof, or the like.

Referring now to the drawings, FIG. 1 illustrates an exemplary driving environment 100 that includes an autonomous vehicle 102. The autonomous vehicle 102 includes a radar sensor system 104 that estimates ego motion of the autonomous vehicle 102 in ambiguous and non-ambiguous velocity environments; accordingly, the radar sensor system 104 can estimate the ego motion of the autonomous vehicle 102 regardless whether the autonomous vehicle is traveling at, above, or below an unambiguous maximum velocity of the radar sensor system 104. Thus, the radar sensor system 104 can estimate velocity of the radar sensor system 104 (and hence, the autonomous vehicle 102 since the radar sensor system 104 and the autonomous vehicle 104 travel in unison) as the autonomous vehicle 102 travels through the driving environment 100.

The autonomous vehicle 102 includes componentry depicted in callout 106. Thus, the autonomous vehicle 102 includes the radar sensor system 104, a mechanical system 108 (e.g., a vehicle propulsion system, a braking system, a steering system, a combination thereof, etc.), and a computing system 110. The radar sensor system 104 can have an ego motion estimation system 112 incorporated therein. The ego motion estimation system 112 can determine an ego motion estimation of the radar sensor system 104; since the radar sensor system 104 is included as part of the autonomous vehicle 102, the ego motion estimation determined by the ego motion estimation system 112 in turn can be an ego motion estimation for the autonomous vehicle 102.

While the autonomous vehicle 102 is shown as including one radar sensor system 104, it is contemplated that the autonomous vehicle 102 can include a plurality of radar sensor systems similar to the radar sensor system 104. The plurality of radar sensor systems can be located around the autonomous vehicle 102 and can have different fields of view relative to the autonomous vehicle 102 covering different portions of the driving environment 100 surrounding the autonomous vehicle 102. Each of the radar sensor systems of the autonomous vehicle 102 can be independently controlled by a radar control system incorporated in the computing system 110. Further, it is contemplated that each of the radar sensor systems (or a subset thereof) can determine an ego motion estimation of the autonomous vehicle 102.

The ego motion estimation system 112 can the employed to generate an instantaneous three-dimensional ego motion estimation of the autonomous vehicle 102. The ego motion estimation system 112 can instantaneously estimate ego motion with three-dimensional components in ambiguous or non-ambiguous velocity environments. Accordingly, in contrast to conventional approaches utilizing radar sensor systems to estimate ego motion that are often limited by an unambiguous maximum velocity of the radar sensor systems, the ego motion estimation system 112 employs an algorithm that enables detection of an ego motion estimation of the autonomous vehicle 102 regardless whether the autonomous vehicle 102 is traveling at, above, or below the unambiguous maximum velocity of the radar sensor system 104. Thus, the ego motion estimation outputted by the ego motion estimation system 112 can be greater than the unambiguous maximum velocity.

The ego motion estimation system 112 can generate the ego motion estimation based on detections that come from a single radar frame. The radar sensor system 104 can be a high-performance radar sensor system (e.g., the radar sensor system 104 can provide high density points and high angle and Doppler resolution). Detection points having radial velocity values, azimuth angle values, elevation angle values, or a combination thereof from a single radar frame collected by the radar sensor system 104 can be used by the ego motion estimation system 112 to generate the ego motion estimation. The estimation performed by the ego motion estimation system 112 can be based on a linear least squares—Moore-Penrose inverse estimation.

The ego motion estimation system 112 generates the ego motion estimation of the radar sensor system 104 based on detection points in a radar frame corresponding to static object(s) in the driving environment 100. The static object(s) in the driving environment can include trees, buildings, roads, bridges, street signs, and so forth. Accordingly, the ego motion estimation system 112 can identify detection points that are likely to correspond to the static object(s) in the driving environment 100 and utilize such detection points for modeling the ego motion estimation. Thus, detection points corresponding to moving object(s) in the driving environment 100 such as other vehicles, pedestrians, or the like can be desirably excluded from use by the ego motion estimation system 112 when generating the ego motion estimation.

The ego motion estimation system 112 can provide high accuracy ego motion estimation. Further, a single radar sensor system 104 implements the approaches described herein; thus, the ego motion estimation can be generated by the single radar sensor system 104. However, in various embodiments, it is contemplated that more than one radar sensor system of the autonomous vehicle 102 can each generate a corresponding ego motion estimation of the autonomous vehicle 104.

The techniques employed by the ego motion estimation system 112 can be applicable regardless of modulation of the radar sensor system 104. For instance, the radar sensor system 104 can be a frequency modulated continuous wave (FMCW) radar sensor system or an orthogonal frequency division multiplexing (OFDM) radar sensor system; however, it is to be appreciated that other modulation schemes employed by the radar sensor system 104 are intended to fall within the scope of the hereto appended claims.

Figure 2:
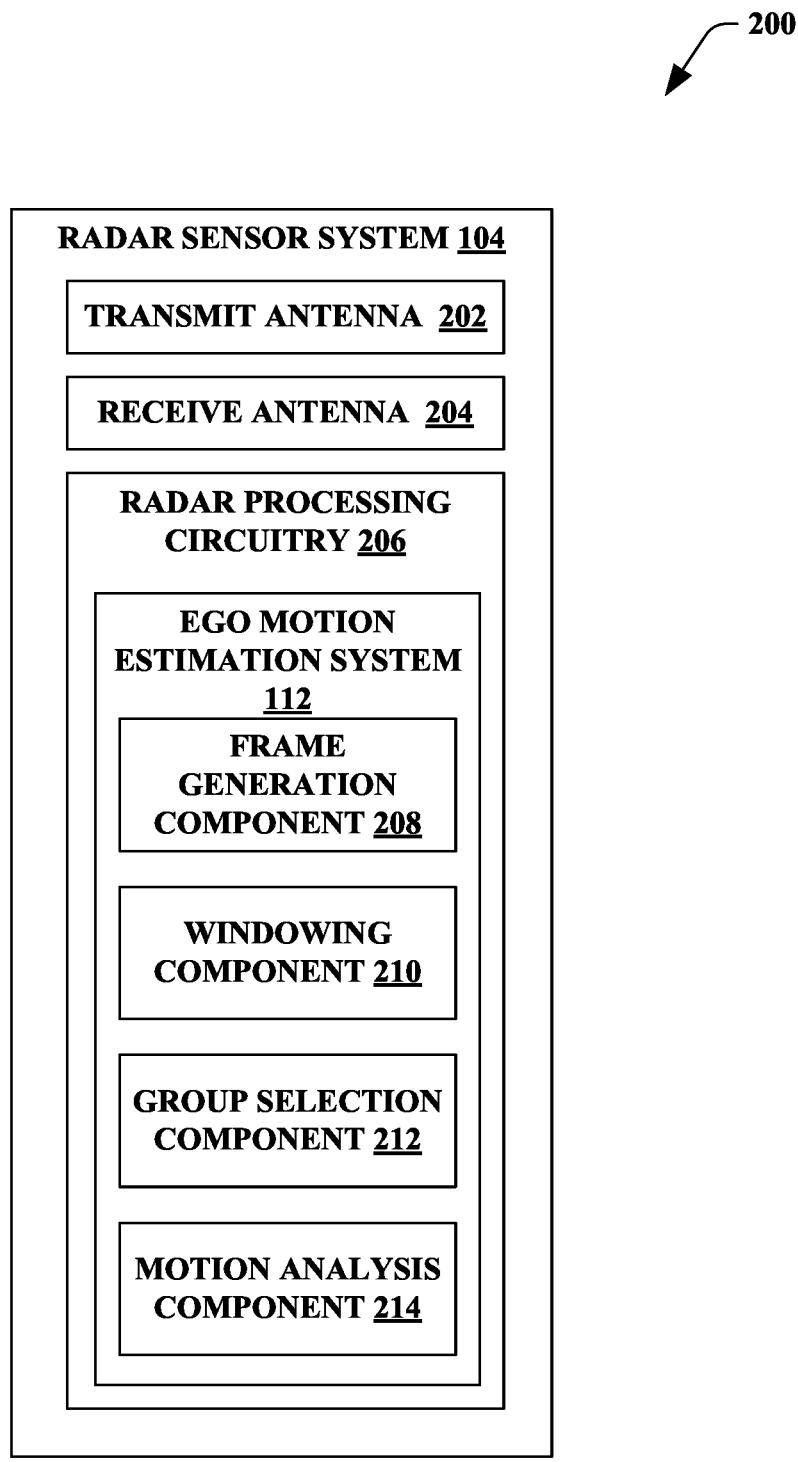
FIG. 2 illustrates a block diagram of an exemplary radar sensor system.

FIG. 2 illustrates the radar sensor system 104 according to various embodiments. The radar sensor system 104 includes a transmit antenna 202, a receive antenna 204, and radar processing circuitry 206, where the radar processing circuitry 206 is configured to perform various acts. The radar processing circuitry 206, for instance, can include a processor and memory, where the memory includes computer-executable instructions that are executed by the processor. Pursuant to various examples, the processor can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like. Moreover, the radar processing circuitry 206 can include the ego motion estimation system 112.

The transmit antenna 202 is configured to transmit a radar signal into an environment of the radar sensor system 104. As described herein, the radar signal can be an FMCW radar signal, an OFDM radar signal, or substantially any other type of radar signal. The radar signal can impinge upon object(s) in the environment such that a portion of the radar signal returns to the radar sensor system 104. The receive antenna 204 is configured to receive a return signal from the environment of the radar sensor system 104 responsive to the radar signal. The radar processing circuitry 206 can process the return signal received from the environment to detect object(s) in the environment. For instance, based on the return signal received from the environment, the radar processing circuitry 206 can provide a radar frame that includes detection points. A detection point can include a radial velocity value, an azimuth angle value, an elevation angle value, a combination thereof, and so forth.

The radar processing circuitry 206 can measure relative velocities of objects in the environment in relation to the radar sensor system 104 based on the return signal received from the environment. Thus, the radar processing circuitry 206 can measure a difference between a velocity of an object in the environment and a velocity of the radar sensor system 104 (e.g., a velocity of the autonomous vehicle 102 that includes the radar sensor system 104 or substantially any other type of vehicle that can include the radar sensor system 104). Moreover, a velocity of static object(s) in a scene can be used to estimate the velocity of the radar sensor system 104. The velocity of the radar sensor system 104 can be opposite the velocity of the static object(s) measured in the driving environment nearby the radar sensor system 104. Accordingly, the radar processing circuitry 206 can use the velocity estimation of the static object(s) to estimate the velocity of the radar sensor system 104 (e.g., to generate the ego motion estimation of the radar sensor system 104).

The radar sensor system 104 can detect radial velocity of objects in the environment based on the return signal received by the receive antenna 204. The detected radial velocity, however, can be limited based on the unambiguous maximum velocity of the radar sensor system 104. The radial velocity of a detection point measured by the radar sensor system 104 can be to decomposed into three Cartesian components with the following equation.

$$Vr = Vx\cos(\varphi)\sin(\theta) + Vy\sin(\varphi)\sin(\theta) + Vz\cos(\theta)$$

In the foregoing, Vr is a radial velocity measured by the radar sensor system 104, φ is an azimuth angle value measured by the radar sensor system 104, and θ is an elevation angle value measured by the radar sensor system 104. Further, Vx, Vy, and Vz are the three-dimensional components in Cartesian coordinates of the radial velocity; Vx, Vy, and Vz are unknown to the radar sensor system 104 (e.g., the radar sensor system 104 are unable to directly measure Vx, Vy, and Vz based on the return signal received from the environment). Thus, a detection point measured by the radar sensor system 104 can include a radial velocity value (Vr), an azimuth angle value (φ), and an elevation angle value (θ); the radar sensor system 104 typically does not directly measure the three-dimensional components that correspond to the radial velocity value (Vx, Vy, and Vz).

To estimate the ego motion of the radar sensor system 104, the ego motion estimation system 112 can estimate the Vx, Vy, and Vz components from the radial velocities Vr of the static targets detected by the radar sensor system 104 based on the return signal received from the environment. The foregoing can be performed by fitting a model with data measured by the radar sensor system 104.

However, radar sensor systems commonly have an unambiguous maximum velocity value that is lower than potential velocities at which the radar sensor systems may be moving. Thus, a limitation in use of conventional radar sensor systems for generating ego motion estimations is that the maximum velocity value that the radar sensor systems can estimate without ambiguity can impact a range of velocities that can be detected. For instance, if the radar sensor system is included as part of an autonomous vehicle that may travel at a velocity greater than an unambiguous maximum velocity of the radar sensor system, then the velocity value will make a wrap.

Figure 3:
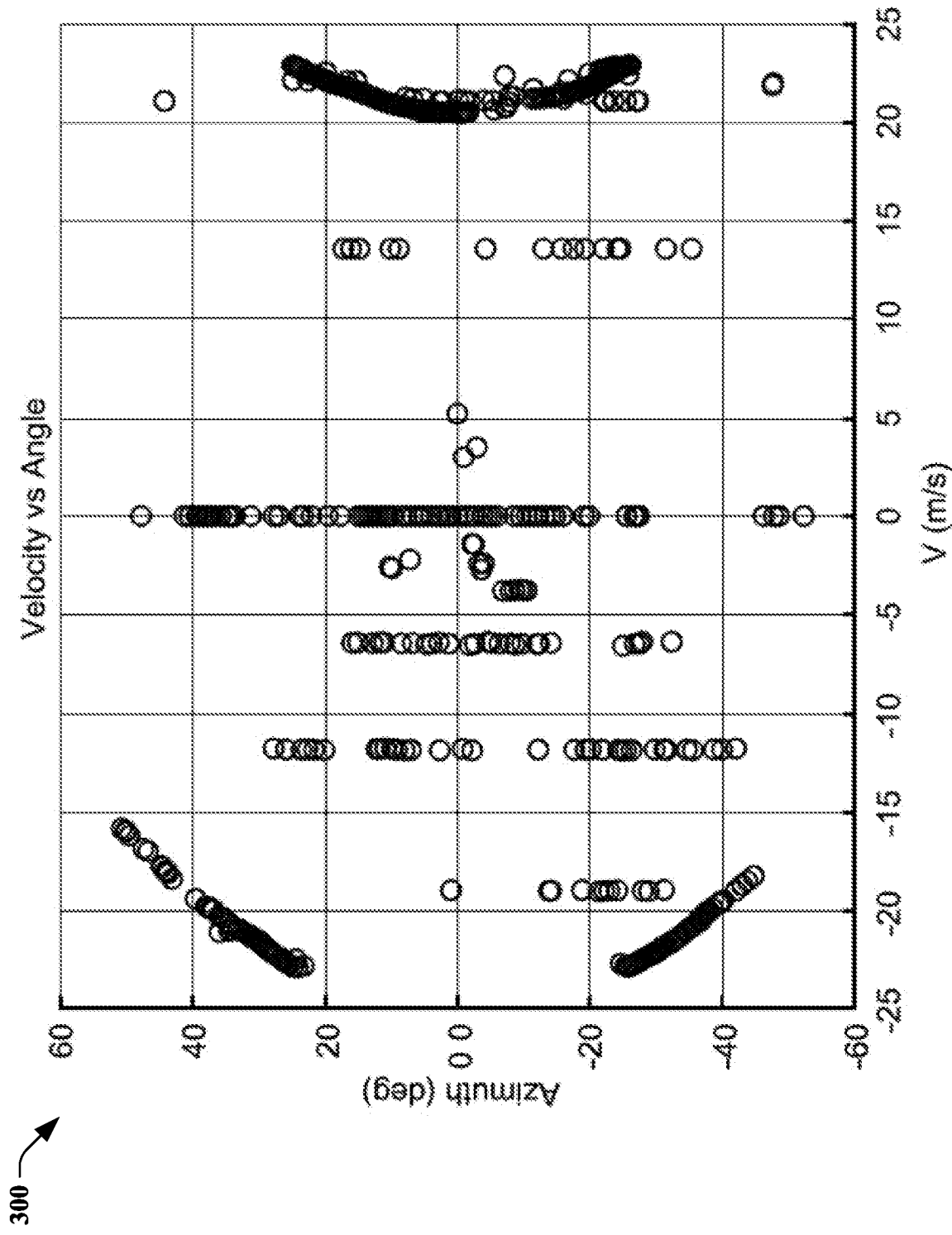
FIG. 3 illustrates an exemplary radar frame that includes detection points detected by the radar sensor system of FIG. 2 based on a return signal received from an environment.

Turning to FIG. 3, illustrated is an exemplary radar frame 300 that includes detection points detected by a radar sensor system (e.g., the radar sensor system 104) based on a return signal received from an environment. Each detection point in the radar frame 300 has a corresponding radial velocity value and azimuth angle value. In the depicted example, the radar sensor system has an unambiguous maximum velocity value (Vmax) of 50 m/s. Accordingly, the detection points measured by the radar sensor system in the radar frame 300 have radial velocity values in a velocity window between-25 m/s to 25 m/s. Pursuant to an example, a target with a velocity of 30 m/s relative to the radar sensor system will be detected by the radar sensor system as having a radial velocity value of −20 m/s due to wrapping of the velocity values.

Reference is again made to FIG. 2. The ego motion estimation system 112 can determine an ego motion estimation of the radar sensor system 104 in ambiguous or non-ambiguous velocity environments. Thus, the ego motion estimation system 112 can disambiguate between potential ambiguous velocity values detected based on the return signal received from the environment.

The ego motion estimation system 112 can include a frame generation component 208, a windowing component 210, a group selection component 212, and a motion analysis component 214. The frame generation component 208 can generate a radar frame based on the return signal received from the environment. The radar frame includes detection points. Each of the detection points can have a radial velocity value and an azimuth angle value. Moreover, each of the detection points can have an elevation angle value. According to an example, the frame generation component 208 can generate the radar frame 300 shown in FIG. 3. The frame generation component 208 can further concatenate the radar frame with at least one shifted radar frame to form a concatenated radar frame. The shifted radar frame can include the detection points of the radar frame having respective radial velocity values shifted by a multiple of an unambiguous maximum velocity value of the radar sensor system 104. As noted above, a velocity of an object relative to the radar sensor system 104 above the unambiguous maximum velocity value of the radar sensor system 104 can lead to wrapping of velocity values. The concatenated radar frame enables various possible ambiguous velocity values to be considered when fitting an ego motion model to the detection points.

Moreover, the windowing component 210 can define windows within the concatenated radar frame. The group selection component 212 can select respective groups of detection points within the windows identified as likely corresponding to one or more static objects in the environment. Further, the motion analysis component 214 can generate potential ego motion estimations based on the groups of detection points within the windows. The motion analysis component 214 can also select one of the potential ego motion estimations as an ego motion estimation of the radar sensor system 104.

The frame generation component 208 can form the concatenated radar frame to enable various possible ambiguous velocity values to be considered. As such, the velocities that can be considered can be represented by:

$$V_{amb} = [\ldots, Vr - 2*V\text{max}, Vr - V\text{max}, Vr, Vr + V\text{max},$$
$$Vr + 2*V\text{max}, \ldots]$$

In the foregoing Vr is the radial velocity value measured by the radar sensor system 104, Vmax is the unambiguous maximum velocity value of the radar sensor system 104, and $V_{amb}$ is a vector with the possible ambiguous velocity values that are considered as part of the concatenated radar frame generated by the frame generation components 208. Accordingly, following the example noted above where Vmax=50 m/s, the velocity window is-25 m/s to 25 m/s, a target is moving with a velocity of 30 m/s, and Vr=−20 m/s, the ambiguous velocity vector can be $V_{amb}$=[ . . . , −120, −70, −20, 30, 80, . . . ] m/s.

Figure 4:
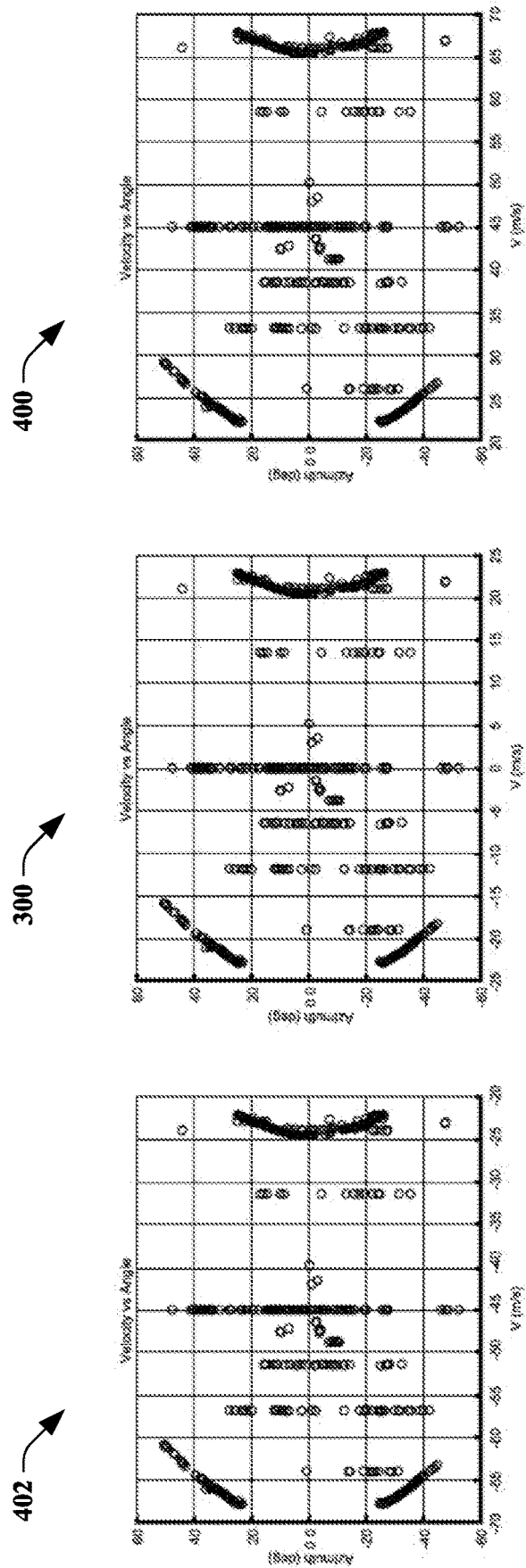
FIG. 4 illustrates the radar frame of FIG. 3 as well as two shifted radar frames.
Figure 5:
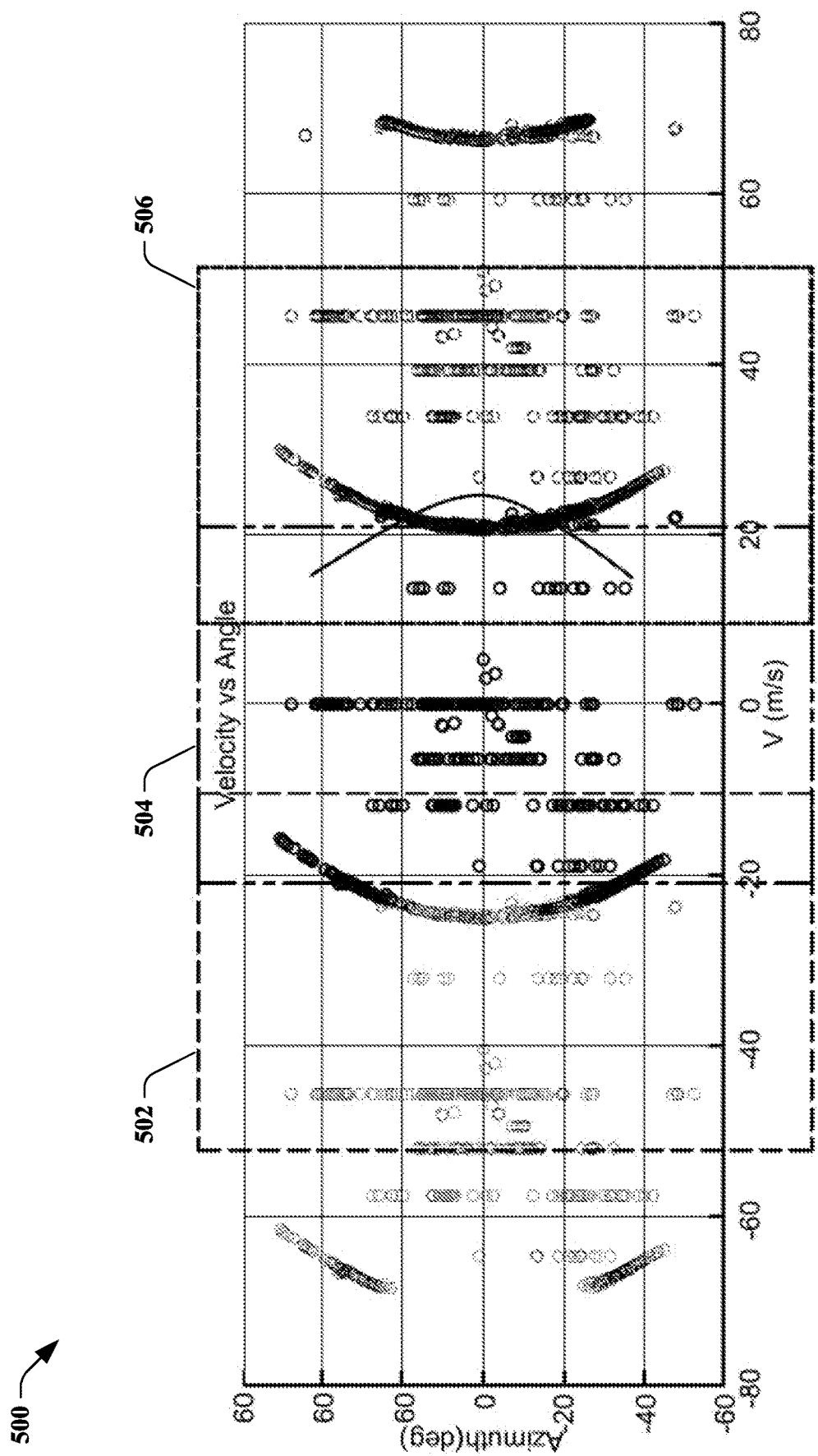
FIG. 5 illustrates an exemplary concatenated radar frame formed by concatenating the radar frame with the shifted radar frames of FIG. 4.

Now turning to FIG. 4, illustrated are the radar frame 300 (of FIG. 3) as well as two shifted radar frames, namely, a shifted radar frame 400 and a shifted radar frame 402. In the shifted radar frame 400, the unambiguous maximum velocity value is added to the radial velocity value of each detection point in the radar frame 300 (Vr+Vmax). Moreover, in the shifted radar frame 402, the unambiguous maximum velocity value is subtracted from the radial velocity value of each detection point in the radar frame (Vr−Vmax). As shown in FIG. 5, a concatenated radar frame 500 is formed by concatenating the radar frame 300 with the shifted radar frame 400 and the shifted radar frame 402.

Reference is again made to FIG. 2. To fit an ego motion model at a correct velocity, the frame generation component 208 can form the concatenated radar frame that includes the possibilities for the ambiguous velocity to be considered for the detection points. According to an example, the frame generation component 208 can form the concatenated radar frame to include all possible velocity values up to a maximum velocity at which the radar sensor system 104 may be traveling (e.g., a maximum velocity of the autonomous vehicle 102).

In a scenario where the radar sensor system 104 is traveling at a velocity near the unambiguous maximum velocity, some of the detection points corresponding to static objects in the environment may be in the radar frame (e.g., the radar frame 300) and a remainder of the detection points corresponding to the static objects in the environment may be in one of the shifted radar frames (e.g., the shifted radar frame 400 or the shifted radar frame 402). Thus, rather than fitting ego motion models to the detection points within the radar frame as well as within the shifted radar frames, the frame generation component 208 can concatenate the detection points from the radar frame and the shifted radar frames to form the concatenated radar frame. Moreover, the windowing component 210 can define windows within the concatenated radar frame that can have overlapping velocity windows; accordingly, at least one of the windows can include the detection points corresponding to the static objects with the correct velocities to enable fitting the ego motion model.

The windowing component 210 can define windows within the concatenated radar frame. Accordingly, the concatenated radar frame can be split into smaller areas by the windowing component 210 with different velocity windows. Moreover, the windows defined by the windowing component 210 within the concatenated radar frame are overlapping. For instance, FIG. 5 depicts a window 502, a window 504, and a window 506 being defined within the concatenated radar frame 500. As shown, the window 502 and the window 504 overlap each other. Likewise, the window 504 and the window 506 overlap each other. Thus, the windowing component 210 allows for providing at least one window that includes the detection points corresponding to the static objects in the environment with the correct velocities, which enables accurately fitting an ego motion model to such detection points.

A maximum size of a window defined by the windowing component 210 can be equal to the unambiguous maximum velocity value, Vmax. A minimum size of a window defined by the windowing component 210 can be equal to two times a size of an overlap between windows, W_overlap_size. Moreover, a size of an overlap between the windows defined by the windowing component 210 (W_overlap_size) can be based on a maximum velocity of the radar sensor system 104 (e.g., a maximum velocity of the autonomous vehicle 102 including the radar sensor system 104, a maximum velocity of a vehicle including the radar sensor system 104), a maximum azimuth angle value measurable by the radar sensor system 104, and a maximum elevation angle value measurable by the radar sensor system 104. The size of the overlap can be set by the windowing component 210 as follows:

$$\text{W\_overlap\_size} = V\text{max}_{car} - V\text{max}_{car} * \cos(\varphi\text{max})\sin(\theta\text{max})$$

In the foregoing, $V\text{max}_{car}$ is the maximum velocity of the radar sensor system 104 (e.g., the maximum velocity of a vehicle that includes the radar sensor system 104), φmax is the maximum azimuth angle value measurable by the radar sensor system 104, and θmax is the maximum elevation angle value measurable by the radar sensor system 104.

According to an example, the entire concatenated radar frame can be divided into windows by the windowing component 210. Pursuant to another example, the windows are defined within a portion of the concatenated radar frame by the windowing component 210 based on an ego motion estimation for a previous time period; a remainder of the concatenated radar frame is not included within a window. Thus, velocities within the remainder of the concatenated radar frame need not be considered when evaluating the ego motion estimation for a current time period (e.g., it is assumed that the velocity does not change from 60 m/s to −60 m/s from one frame to a next frame).

The group selection component 212 can further select respective groups of detection points within the windows identified as likely corresponding to one or more static objects in the environment. The concatenated radar frame (and thus, the windows formed by the windowing component 210) includes detection points corresponding to static objects (e.g., buildings, trees, roads, etc.) and moving objects (e.g., other vehicles, pedestrians). However, it is desired to fit an ego motion model only on detection points corresponding to the static objects. Accordingly, the group selection component 212 can pre-estimate which detection points in each of the windows probably come from static objects in the environment.

The group selection component 212 can generate single dimension velocity component estimate values for the detection points in a window based on the radial velocity values and the azimuth angle values of the detection points. The single dimension velocity component estimate values for the detection points can further be generated based on the elevation angle values of the detection points. Moreover, the group selection component 212 can separate the detection points in the window into potential groups based on the single dimension velocity component estimate values. The detection points in the window can be separated into the potential groups based on a predefined velocity variance value. The group selection component 212 can further select, from the potential groups, a group that includes a maximum number of detection points.

Figure 6:
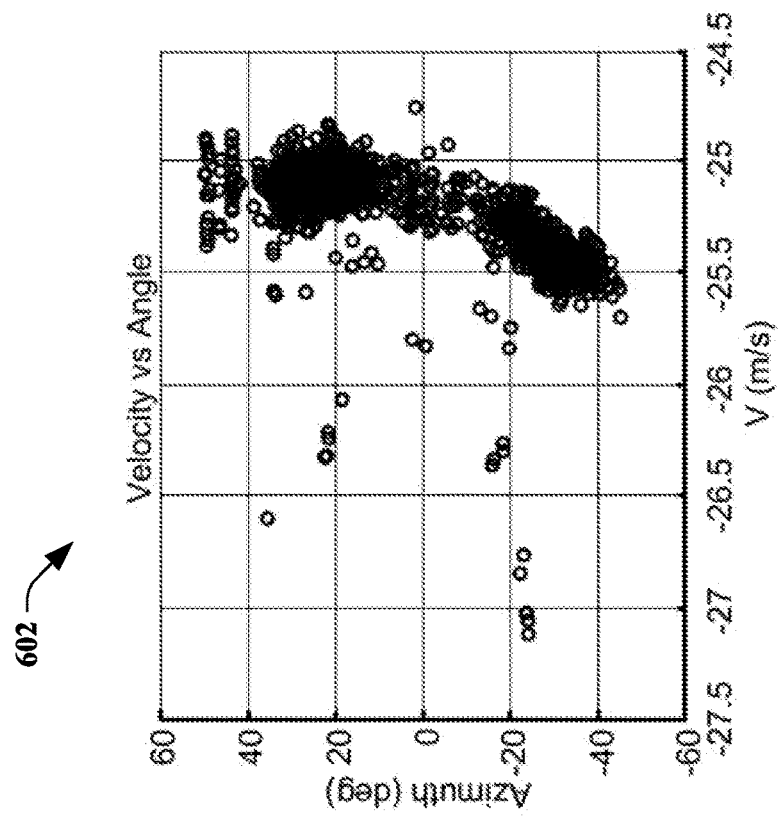
FIG. 6 illustrates a comparison between radial velocity values of detection points and single dimension velocity component estimate values corresponding to the radial velocity values of the detection points.
Figure 6:
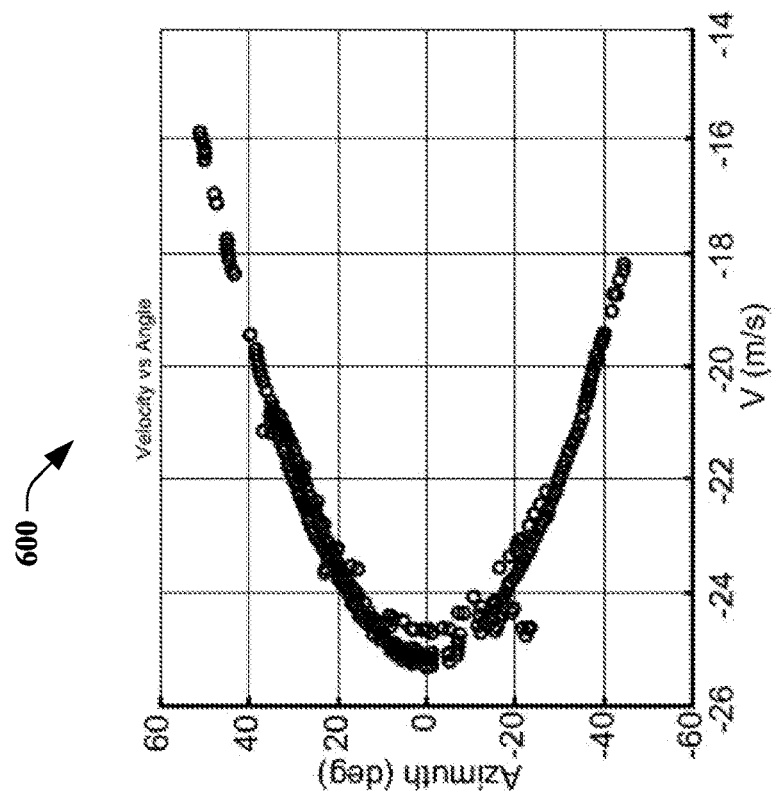

Thus, the group selection component 212 can divide the detection points of each window into groups based on velocity values. However, the radial velocity values of static objects can vary significantly. For instance, as shown in FIG. 6, window 600 depicts detection points corresponding to static objects having radial velocities that vary by more than 10 m/s as a function of azimuth angle value. Such wide range of radial velocity values that correspond to static objects can lead to difficulties in accurately identifying detection points that are likely to correspond to static objects. In contrast, window 602 depicts single dimension velocity component estimate values corresponding to the radial velocity values of the window 600. In contrast to the 10 m/s variance shown in the window 600, the detection points corresponding to the static objects can have single dimension velocity component estimate values that vary by 2 m/s (or less) in the window 602.

Reference is again made to FIG. 2. The single dimension velocity component estimate values generated by the group selection component 212 can be the Vx components of the radial velocities for the detection points. The group selection component 212 can estimate a Vx component of a radial velocity for a detection point by considering the other components (namely, the Vy and Vz components) for the detection point to be zero. For example, since the Vy and Vz components are considered to be zero, the Vx component can be evaluated based on the following: $Vr=Vx \cos(\varphi)\sin(\theta)$. Although the estimated value of the Vx component may have some inaccuracy due to the Vy and Vz components being considered zero, this estimation provides smaller variance between velocity values of static detections. Accordingly, the group selection component 212 can use the pre-estimated Vx components to group detection points with similar velocities. For instance, the group selection component 212 can form potential groups of detection points within a window by grouping detection points having Vx components within the predefined velocity variance value. Moreover, within each window, the group selection component 212 can select a group with a highest number of detection points (from the potential groups) for fitting the ego motion model.

As noted above, the motion analysis component 214 can generate the potential ego motion estimations based on the groups of detection points within the windows (as selected by the group selection component 212). Further, the motion analysis component 214 can select one of the potential ego motion estimations as an ego motion estimation of the radar sensor system 104.

When generating a potential ego motion estimation based on a group of detection points within a window, the motion analysis component 214 can select a predefined number of samples from the detection points in the group. Moreover, the motion analysis component 214 can generate an ego motion model based on the samples. Further, the motion analysis component 214 can estimate respective error values of the samples based on the ego motion model. The motion analysis component 214 can remove a subset of the samples; the subset of the samples can be removed by comparing the respective error values to a predetermined error factor. The motion analysis component 214 can also generate an updated ego motion model based on a remaining subset of the samples.

According to an example, the motion analysis component 214 can repeat estimating the respective error values, removing the subset of the samples, and generating the updated ego motion model based on the remaining subset of the samples a predetermined number of times (T times, where T can be substantially any integer greater than 1). Following this example, a final updated ego motion model generated for the window (after the predetermined number of iterations) is the potential ego motion estimation for the window.

Pursuant to another example, the motion analysis component 214 can repeat estimating the respective error values, removing the subset of the samples, and generating the updated ego motion model based on the remaining subset of the samples until reaching a preset error value. Again, following this example, a final updated ego motion model generated for the window (after the number of iterations performed until reaching the preset error value) is the potential ego motion estimation for the window.

The motion analysis component 214 similarly generates the potential ego motion estimations for each of the windows. Thus, each of the potential ego motion estimations can be based a respective remaining subset of the samples. The motion analysis component 214 can select one of the potential ego motion estimations as the ego motion estimation for the radar sensor system 104 (e.g., for the autonomous vehicle 102). The ego motion estimation can be selected by the motion analysis component 214 based on numbers of remaining samples upon which updated ego motion models are generated for each of the windows. More particularly, the potential ego motion estimation based on the largest number of remaining samples can be selected by the motion analysis component 214 as the ego motion estimation for the radar sensor system 104.

Figure 7:
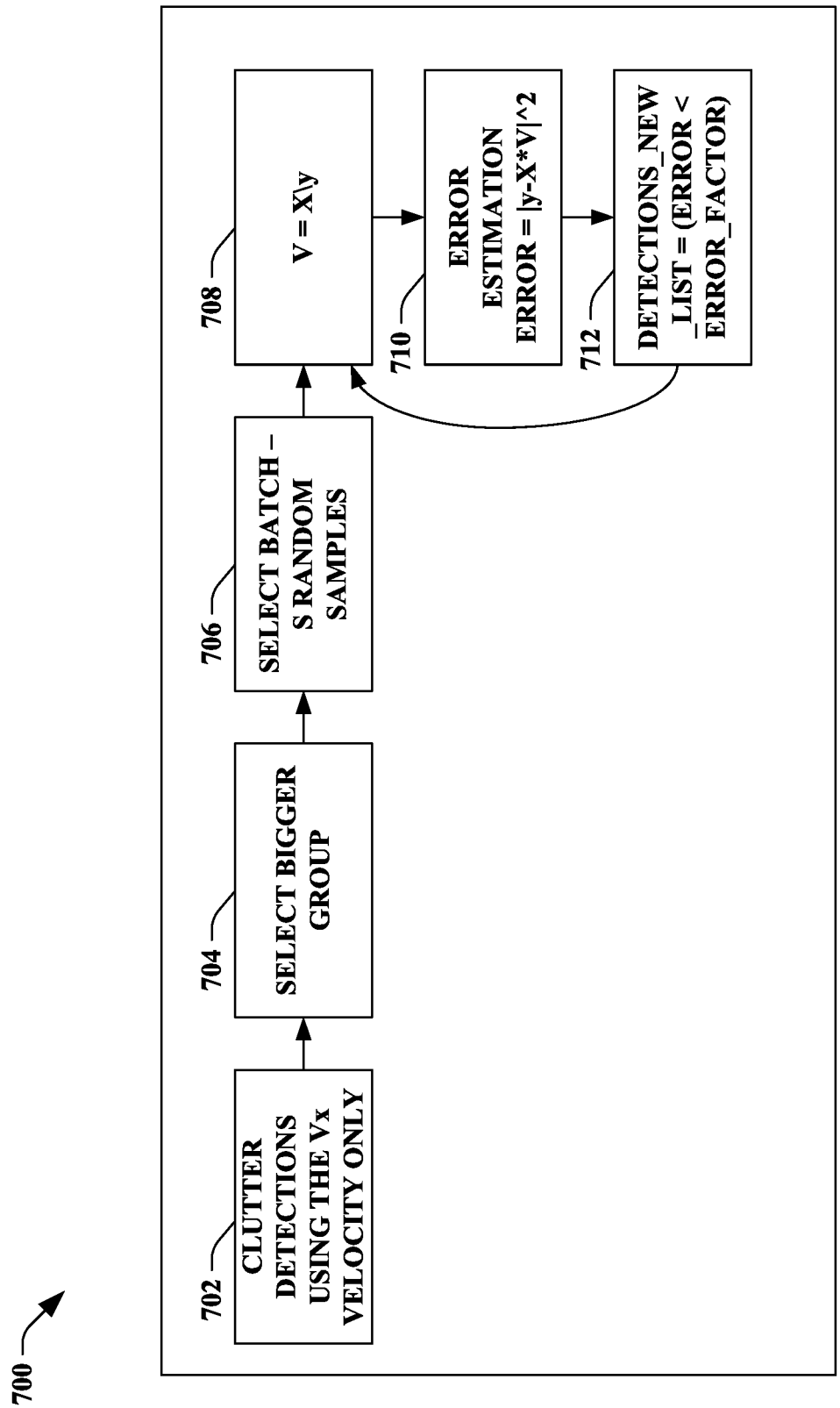
FIG. 7 illustrates a block diagram representing an exemplary algorithm based on a linear least squares—Moore-Penrose inverse estimation.

Turning to FIG. 7, illustrated is an exemplary algorithm 700 based on a linear least squares—Moore-Penrose inverse estimation that can be performed by the group selection component 212 and the motion analysis component 214 of the ego motion estimation system 112. The algorithm 700 is performed for each window defined within the concatenated radar frame by the windowing component 210.

At 702, detection points can be cluttered using only the Vx component of the velocity (e.g., detection points can be separated into the potential groups based on the single dimension velocity component estimate values). At 704, a group with a maximum number of detection points can be selected. It is contemplated that acts 702 and 704 can be performed by the group selection component 212 as described above. Moreover, acts 706-712 can be performed by the motion analysis component 214 as described above.

At 706, a batch of S random samples can be selected from the detection points in the group. It is contemplated that S can be substantially any integer greater than 3. At 708, an ego motion model can be generated based on the samples. The ego motion model can be evaluated as $V=X\backslash y$. In the foregoing, $X=[\cos(\varphi)\cos(\theta), \sin(\varphi)\cos(\theta), \sin(\theta)]$. Moreover, $y=Vr$. Further, $V=[Vx, Vy, Vz]'$. Further, to calculate the error of each velocity component, a partial derivative of a total error can be taken with respect to the respective velocity component (e.g., Vx, Vy, or Vz). At 710, the respective error values of the samples can be estimated based on the ego motion model. The error values can be evaluated as $Error=|y-X*V|^2$. At 712, the subset of the samples having error values above the predetermined error factor can be removed. Accordingly, a remaining subset of the samples (Detections_New_List) can remain after removing detection points from the group of samples that have an error greater than the predefined error factor for a next iteration.

According to an example, acts 708, 710, and 712 can be performed a predetermined number of times, T. Pursuant to another example, the acts 708, 710, and 712 can be performed until reaching a preset error value. Moreover, the algorithm 700 can be performed for each window defined by the windowing component 210. A window with a highest number of detection points in the final list can be set as the window with the correct ego motion model. Pursuant to an example, if a previous frame estimate is available, then the algorithm 700 can be performed for windows with values close to the previous estimate.

Figure 8:
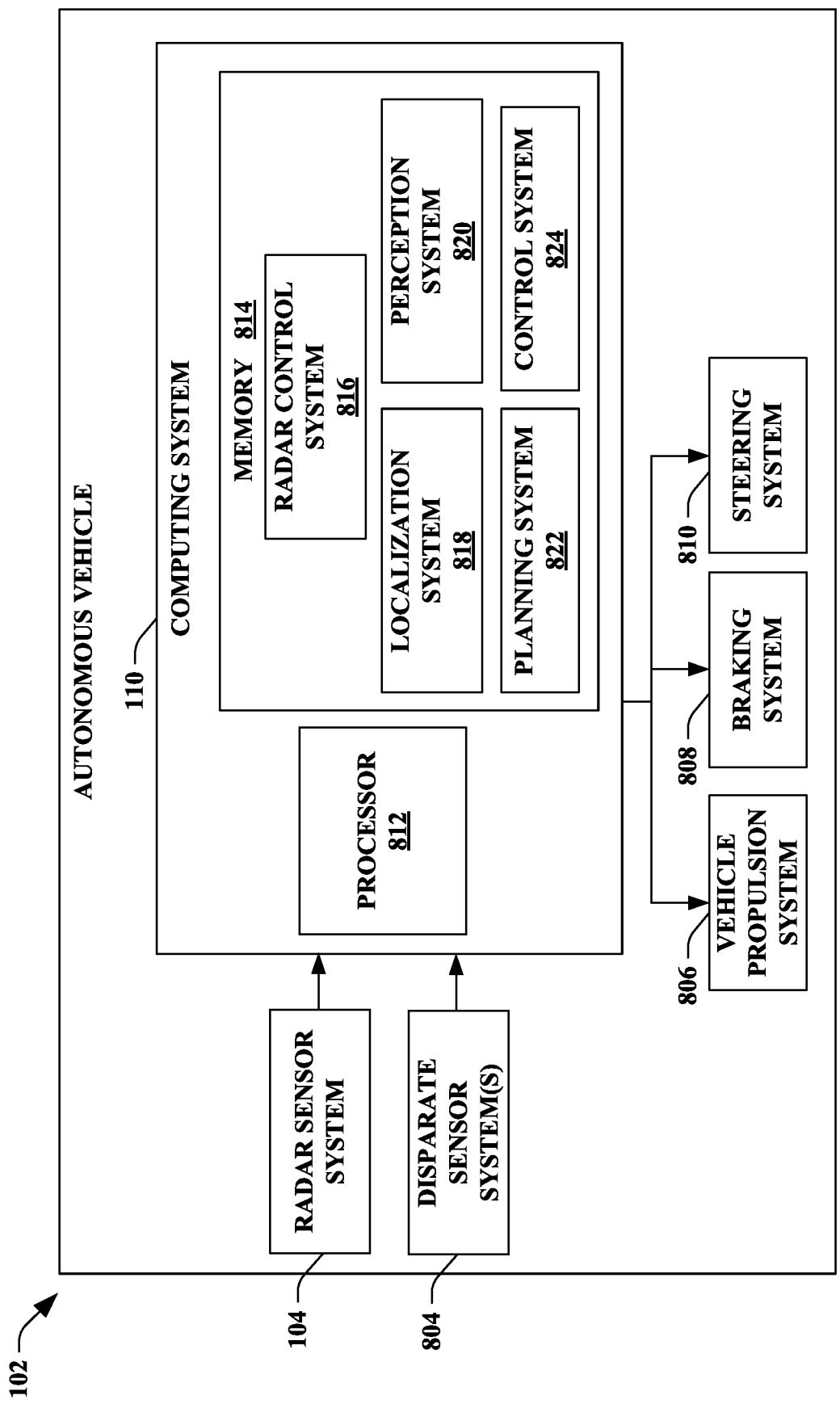
FIG. 8 illustrates an autonomous vehicle according to various embodiments.

Turning to FIG. 8, illustrated is an autonomous vehicle 102 according to various embodiments. The autonomous vehicle 102 can navigate about roadways without human conduction based upon sensor signals outputted by sensor systems of the autonomous vehicle 102. The autonomous vehicle 102 includes a plurality of sensor systems. More particularly, the autonomous vehicle 102 includes a radar sensor system 104 (e.g., which can include the ego motion estimation system 112). The autonomous vehicle 102 can further include one or more disparate sensor systems 804.

The disparate sensor systems 804 can include GPS system(s), ultrasonic sensor(s), infrared system(s), camera system(s), lidar system(s), additional radar sensor system(s), and the like. The sensor systems 104 and 804 can be arranged about the autonomous vehicle 102.

The autonomous vehicle 102 further includes several mechanical systems (e.g., the mechanical system 108) that are used to effectuate appropriate motion of the autonomous vehicle 102. For instance, the mechanical systems can include, but are not limited to, a vehicle propulsion system 806, a braking system 808, and a steering system 810. The vehicle propulsion system 806 may be an electric engine or a combustion engine. The braking system 808 can include an engine brake, brake pads, actuators, and/or any other suitable componentry that is configured to assist in decelerating the autonomous vehicle 102. The steering system 810 includes suitable componentry that is configured to control the direction of movement of the autonomous vehicle 102.

The autonomous vehicle 102 additionally includes the computing system 110 that is in communication with the sensor systems 104 and 804, the vehicle propulsion system 806, the braking system 808, and the steering system 810. The computing system 110 includes a processor 812 and memory 814; the memory 814 includes computer-executable instructions that are executed by the processor 812. Pursuant to various examples, the processor 812 can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like.

The memory 814 of the computing system 110 can include a radar control system 816, a localization system 818, a perception system 820, a planning system 822, and a control system 824. The radar control system 816 is configured to control the radar sensor system 104. For example, the radar control system 816 can control windows defined by the windowing component 210 of the ego motion estimation system 112 and/or considered when determining an ego motion estimation for a time period based on a prior ego motion estimation of the autonomous vehicle 102 for a previous time period. The localization system 818 can be configured to determine a local position of the autonomous vehicle 102. The perception system 820 can be configured to perceive objects nearby the autonomous vehicle 102 (e.g., based on outputs from the sensor systems 104 and 804). For instance, the perception system 820 can detect, classify, and predict behaviors of objects nearby the autonomous vehicle 102. The perception system 820 (and/or differing system(s) included in the memory 814) can track the objects nearby the autonomous vehicle 102 and/or make predictions with respect to the environment in which the autonomous vehicle 102 is operating (e.g., predict the behaviors of the objects nearby the autonomous vehicle 102). Further, the planning system 822 can plan motion of the autonomous vehicle 102. Moreover, the control system 824 can be configured to control at least one of the mechanical systems of the autonomous vehicle 102 (e.g., at least one of the vehicle propulsion system 806, the braking system 808, and/or the steering system 810).

An operation of the autonomous vehicle 102 can be controlled by the computing system 110 based at least in part on the ego motion estimation outputted by the radar sensor system 104. While the radar sensor system 104 is described as being included as part of the autonomous vehicle 102 in FIG. 8, it is contemplated that the radar sensor system 104 can be utilized in other types of scenarios (e.g., included in other types of systems, etc.). Moreover, in other embodiments, it is contemplated that the radar sensor system 104 can include the radar control system 816 (e.g., the radar processing circuitry 206 can include the radar control system 816).

Figure 9:
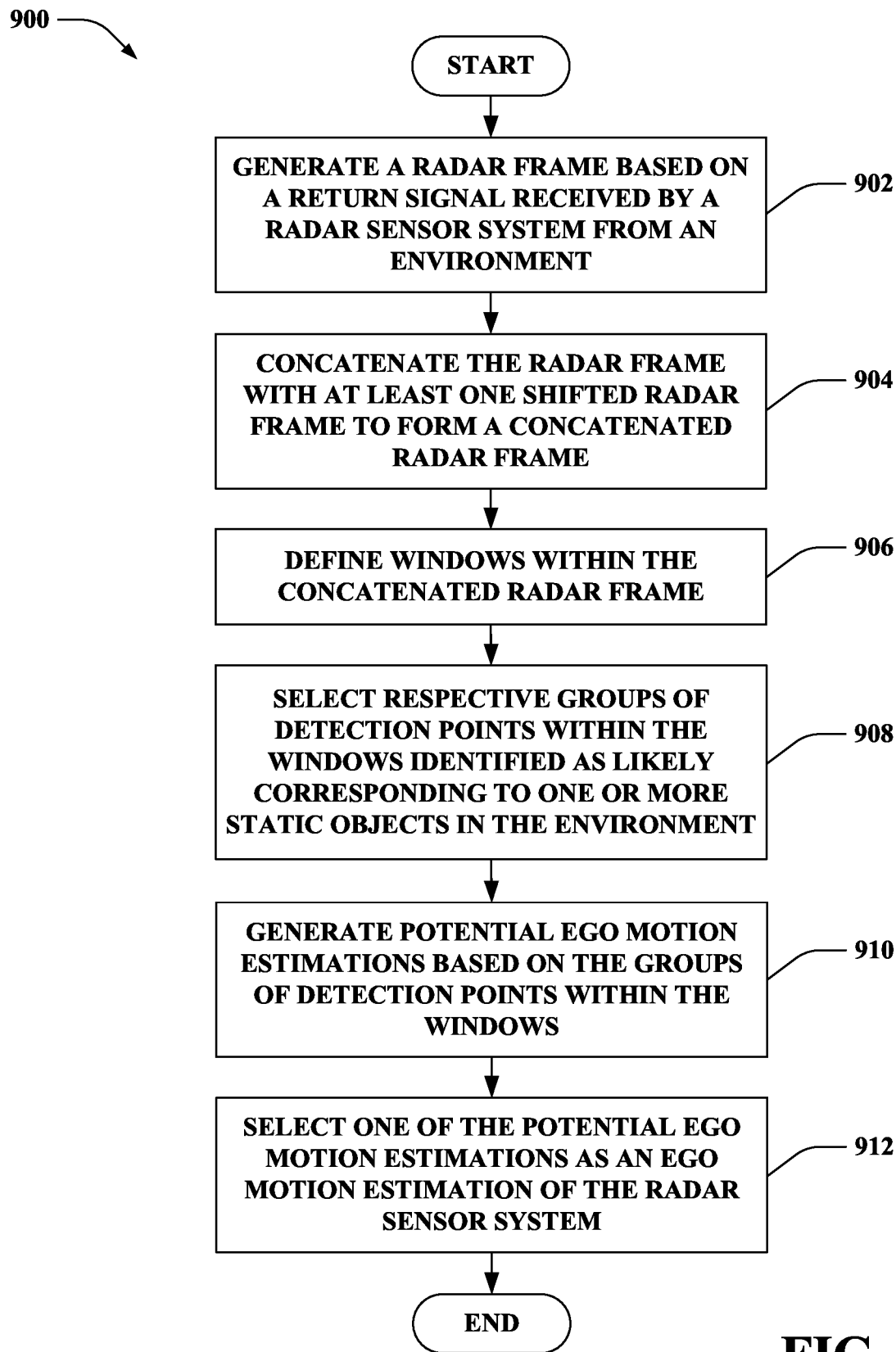
FIG. 9 is a flow diagram that illustrates an exemplary methodology of estimating ego motion using a radar sensor system.

FIG. 9 illustrates an exemplary methodology relating to estimating ego motion using automotive radar sensor systems in ambiguous and non-ambiguous velocity environments. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 of estimating ego motion using a radar sensor system. At 902, a radar frame can be generated based on a return signal received by a radar sensor system from an environment. The return signal can be received responsive to a radar signal transmitted into the environment by the radar sensor system. Moreover, the radar frame includes detection points, where each of the detection points has a radial velocity value and an azimuth angle value. At 904, the radar frame can be concatenated with at least one shifted radar frame to form a concatenated radar frame. The shifted radar frame includes the detection points of the radar frame having respective radial velocity values shifted by a multiple of an unambiguous maximum velocity value of the radar sensor system. At 906, windows can be defined within the concatenated radar frame. At 908, respective groups of detection points within the windows identified as likely corresponding to one or more static objects in the environment can be selected. At 910, potential ego motion estimations can be generated based on the groups of detection points within the windows. At 912, one of the potential ego motion estimations can be selected as an ego motion estimation of the radar sensor system.

Figure 10:
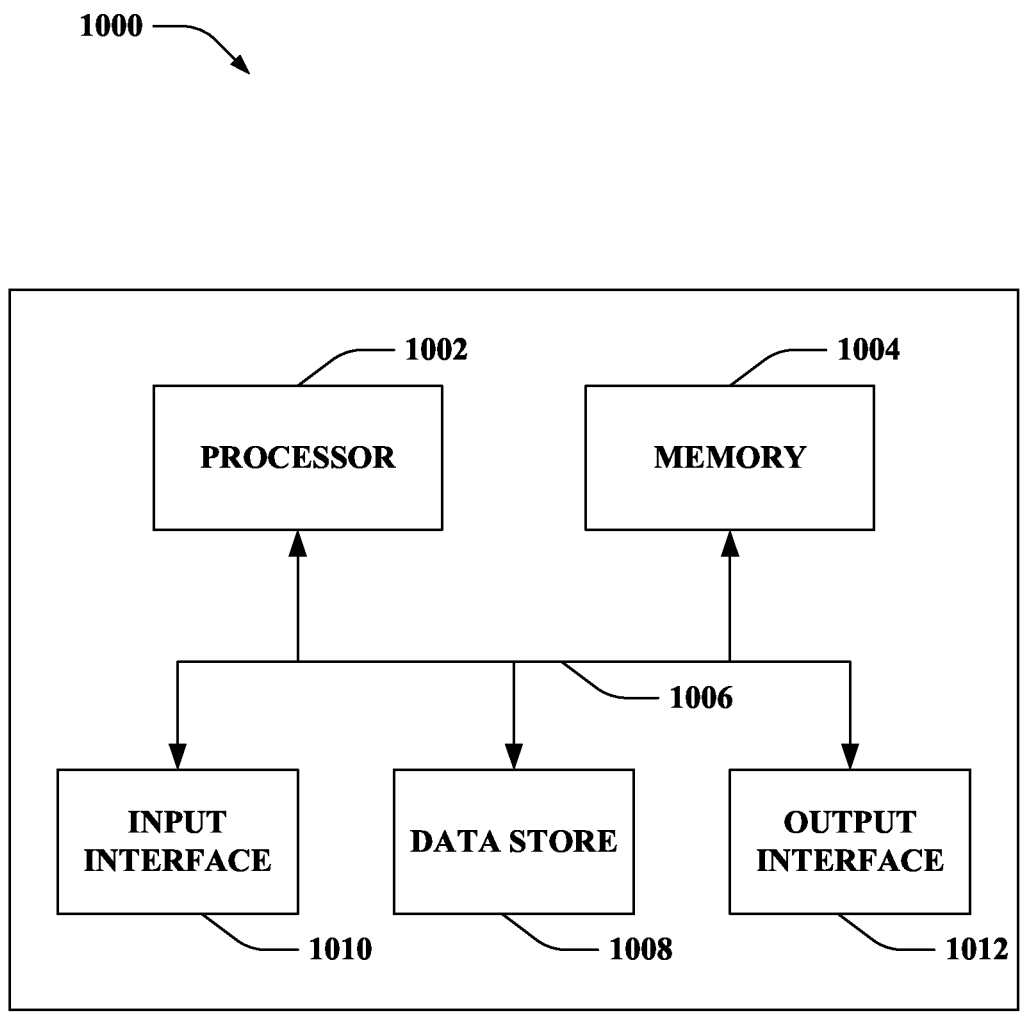
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be or include the computing system 110. According to another example, the computing device 1000 may be or include the radar processing circuitry 206. The computing device 1000 includes at least one processor 1002 that executes instructions that are stored in a memory 1004. The instructions may be, for instance, instructions for implementing functionality described as being carried out by one or more systems discussed above or instructions for implementing one or more of the methods described above. The processor 1002 may be a GPU, a plurality of GPUs, a CPU, a plurality of CPUs, a multi-core processor, etc. The processor 1002 may access the memory 1004 by way of a system bus 1006. In addition to storing executable instructions, the memory 1004 may also store radar data, detection points, ego motion estimations, and so forth.

The computing device 1000 additionally includes a data store 1008 that is accessible by the processor 1002 by way of the system bus 1006. The data store 1008 may include executable instructions, radar data, detection points, ego motion estimations, etc. The computing device 1000 also includes an input interface 1010 that allows external devices to communicate with the computing device 1000. For instance, the input interface 1010 may be used to receive instructions from an external computer device, etc. The computing device 1000 also includes an output interface 1012 that interfaces the computing device 1000 with one or more external devices. For example, the computing device 1000 may transmit control signals to the vehicle propulsion system 806, the braking system 808, and/or the steering system 810 by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Systems and methods have been described herein in accordance with at least the examples set forth below.

(A1) In one aspect, a radar sensor system is described herein. The radar sensor system includes a transmit antenna, a receive antenna, and radar processing circuitry. The transmit antenna is configured to transmit a radar signal into an environment of the radar sensor system. The receive antenna is configured to receive a return signal from the environment of the radar sensor system responsive to the radar signal. The radar processing circuitry is configured to perform acts including generating a radar frame based on the return signal received from the environment, where the radar frame includes detection points, and each of the detection points has a radial velocity value and an azimuth angle value. The acts further include concatenating the radar frame with at least one shifted radar frame to form a concatenated radar frame, where the shifted radar frame includes the detection points of the radar frame having respective radial velocity values shifted by a multiple of an unambiguous maximum velocity value of the radar sensor system. Moreover, the acts include defining windows within the concatenated radar frame. The acts also include selecting respective groups of detection points within the windows identified as likely corresponding to one or more static objects in the environment. The acts further include generating potential ego motion estimations based on the groups of detection points within the windows. Moreover, the acts include selecting one of the potential ego motion estimations as an ego motion estimation of the radar sensor system.

(A2) In some embodiments of the radar sensor system of (A1), the windows within the concatenated radar frame are overlapping.

(A3) In some embodiments of the radar sensor system of (A2), a size of an overlap between the windows is based on a maximum velocity of the radar sensor system, a maximum azimuth angle value measurable by the radar sensor system, and a maximum elevation angle value measurable by the radar sensor system.

(A4) In some embodiments of at least one of the radar sensor systems of (A1)-(A3), the act of selecting the respective groups of detection points within the windows further includes, within each of the windows: generating single dimension velocity component estimate values for the detection points in the window based on the radial velocity values and the azimuth angle values of the detection points; separating the detection points into potential groups based on the single dimension velocity component estimate values; and selecting, from the potential groups, a group that includes a maximum number of detection points.

(A5) In some embodiments of the radar sensor system of (A4), the detection points are separated into the potential groups based on a predefined velocity variance value.

(A6) In some embodiments of at least one of the radar sensor systems of (A1)-(A5), the act of generating the potential ego motion estimations based on the groups of detection points within the windows further includes, within each of the windows: selecting a predefined number of samples from the detection points in the group; generating an ego motion model based on the samples; estimating respective error values of the samples based on the ego motion model; removing a subset of the samples, the subset of the samples being removed by comparing the respective error values to a predetermined error factor; and generating an updated ego motion model based on a remaining subset of the samples.

(A7) In some embodiments of the radar sensor system of (A6), the acts of estimating the respective error values, removing the subset of the samples, and generating the updated ego motion model based on the remaining subset of the samples are repeated a predetermined number of times.

A final updated ego motion model generated for a window is a potential ego motion estimation for the window.

(A8) In some embodiments of the radar sensor system of (A6), the acts of estimating the respective error values, removing the subset of the samples, and generating the updated ego motion model based on the remaining subset of the samples are repeated until reaching a preset error value. A final updated ego motion model generated for a window is a potential ego motion estimation for the window.

(A9) In some embodiments of at least one of the radar sensor systems of (A1)-(A8), the act of selecting one of the potential ego motion estimations as the ego motion estimation of the radar sensor system further includes selecting the ego motion estimation based on numbers of remaining samples upon which updated ego motion models are generated for each of the windows.

(A10) In some embodiments of at least one of the radar sensor systems of (A1)-(A9), the windows are defined within a portion of the concatenated radar frame based on an ego motion estimation for a previous time period.

(A11) In some embodiments of at least one of the radar sensor systems of (A1)-(A10), the radar sensor system being included as part of an autonomous vehicle.

(B1) In another aspect, an autonomous vehicle includes a radar sensor system. The radar sensor system includes a transmit antenna, a receive antenna, and radar processing circuitry. The transmit antenna is configured to transmit a radar signal into an environment of the radar sensor system. The receive antenna is configured to receive a return signal from the environment of the radar sensor system responsive to the radar signal. The radar processing circuitry is configured to perform acts. The acts include generating a radar frame based on the return signal received from the environment, where the radar frame includes detection points, and each of the detection points has a radial velocity value and an azimuth angle value. The acts further include concatenating the radar frame with at least one shifted radar frame to form a concatenated radar frame, where the shifted radar frame includes the detection points of the radar frame having respective radial velocity values shifted by a multiple of an unambiguous maximum velocity value of the radar sensor system. Moreover, the acts include defining windows within the concatenated radar frame. The acts also include selecting respective groups of detection points within the windows identified as likely corresponding to one or more static objects in the environment. Moreover, the acts include generating potential ego motion estimations based on the groups of detection points within the windows. Further, the acts include selecting one of the potential ego motion estimations as an ego motion estimation of the autonomous vehicle.

(B2) In some embodiments of the autonomous vehicle of (B1), the windows within the concatenated radar frame are overlapping.

(B3) In some embodiments of the autonomous vehicle of (B2), a size of an overlap between the windows is based on a maximum velocity of the autonomous vehicle, a maximum azimuth angle value measurable by the radar sensor system, and a maximum elevation angle value measurable by the radar sensor system.

(B4) In some embodiments of at least one of the autonomous vehicles of (B1)-(B3), the act of selecting the respective groups of detection points within the windows further includes, within each of the windows: generating single dimension velocity component estimate values for the detection points in the window based on the radial velocity values and the azimuth angle values of the detection points; separating the detection points into potential groups based on the single dimension velocity component estimate values; and selecting, from the potential groups, a group that includes a maximum number of detection points.

(B5) In some embodiments of at least one of the autonomous vehicles of (B1)-(B4), the act of generating the potential ego motion estimations based on the groups of detection points within the windows further includes, within each of the windows: selecting a predefined number of samples from the detection points in the group; generating an ego motion model based on the samples; estimating respective error values of the samples based on the ego motion model; removing a subset of the samples, the subset of the samples being removed by comparing the respective error values to a predetermined error factor; and generating an updated ego motion model based on a remaining subset of the samples.

(B6) In some embodiments of the autonomous vehicle of (B5), the acts of estimating the respective error values, removing the subset of the samples, and generating the updated ego motion model based on the remaining subset of the samples are repeated. A final updated ego motion model generated for a window is a potential ego motion estimation for the window.

(B7) In some embodiments of at least one of the autonomous vehicles of (B1)-(B6), the act of selecting one of the potential ego motion estimations as the ego motion estimation of the autonomous vehicle further includes selecting the ego motion estimation based on numbers of remaining samples upon which updated ego motion models are generated for each of the windows.

(B8) In some embodiments of at least one of the autonomous vehicles of (B1)-(B7), the windows are defined within a portion of the concatenated radar frame based on an ego motion estimation for a previous time period.

(C1) In another aspect, a method of estimating ego motion using a radar sensor system is described. The method includes generating a radar frame based on a return signal received by the radar sensor system from an environment, the return signal being received responsive to a radar signal transmitted into the environment by the radar sensor system. The radar frame includes detection points, and each of the detection points has a radial velocity value and an azimuth angle value. The method also includes concatenating the radar frame with at least one shifted radar frame to form a concatenated radar frame, where the shifted radar frame includes the detection points of the radar frame having respective radial velocity values shifted by a multiple of an unambiguous maximum velocity value of the radar sensor system. Moreover, the method includes defining windows within the concatenated radar frame. The method also includes selecting respective groups of detection points within the windows identified as likely corresponding to one or more static objects in the environment. Further, the method includes generating potential ego motion estimations based on the groups of detection points within the windows. The method also includes selecting one of the potential ego motion estimations as an ego motion estimation of the radar sensor system.

(C2) In some embodiments of the method of (C1), the windows within the concatenated radar frame are overlapping.

(C3) In some embodiments of at least one of the methods of (C1)-(C2), selecting the respective groups of detection points within the windows comprises, within each of the windows: generating single dimension velocity component estimate values for the detection points in the window based on the radial velocity values and the azimuth angle values of the detection points; separating the detection points into potential groups based on the single dimension velocity component estimate values; and selecting, from the potential groups, a group that includes a maximum number of detection points.

(C4) In some embodiments of at least one of the methods of (C1)-(C3), generating the potential ego motion estimations based on the groups of detection points within the windows comprises, within each of the windows: selecting a predefined number of samples from the detection points in the group; generating an ego motion model based on the samples; estimating respective error values of the samples based on the ego motion model; removing a subset of the samples, the subset of the samples being removed by comparing the respective error values to a predetermined error factor; and generating an updated ego motion model based on a remaining subset of the samples.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A radar sensor system, comprising:
    a transmit antenna configured to transmit a radar signal into an environment of the radar sensor system;
    a receive antenna configured to receive a return signal from the environment of the radar sensor system responsive to the radar signal; and
    radar processing circuitry that is configured to perform acts comprising:
        generating a radar frame based on the return signal received from the environment, the radar frame comprises detection points, each of the detection points having a radial velocity value and an azimuth angle value;
        concatenating the radar frame with at least one shifted radar frame to form a concatenated radar frame, the shifted radar frame comprises the detection points of the radar frame having respective radial velocity values shifted by a multiple of an unambiguous maximum velocity value of the radar sensor system;
        defining windows within the concatenated radar frame;
        selecting respective groups of detection points within the windows identified as likely corresponding to one or more static objects in the environment;
        generating potential ego motion estimations based on the groups of detection points within the windows; and
        selecting one of the potential ego motion estimations as an ego motion estimation of the radar sensor system.

2. The radar sensor system of claim 1, wherein the windows within the concatenated radar frame are overlapping.

3. The radar sensor system of claim 2, wherein a size of an overlap between the windows is based on a maximum velocity of the radar sensor system, a maximum azimuth angle value measurable by the radar sensor system, and a maximum elevation angle value measurable by the radar sensor system.

4. The radar sensor system of claim 1, wherein selecting the respective groups of detection points within the windows comprises, within each of the windows:
    generating single dimension velocity component estimate values for the detection points in the window based on the radial velocity values and the azimuth angle values of the detection points;
    separating the detection points into potential groups based on the single dimension velocity component estimate values; and
    selecting, from the potential groups, a group that includes a maximum number of detection points.

5. The radar sensor of claim 4, wherein the detection points are separated into the potential groups based on a predefined velocity variance value.

6. The radar sensor system of claim 1, wherein generating the potential ego motion estimations based on the groups of detection points within the windows comprises, within each of the windows:
    selecting a predefined number of samples from the detection points in the group;
    generating an ego motion model based on the samples;
    estimating respective error values of the samples based on the ego motion model;
    removing a subset of the samples, the subset of the samples being removed by comparing the respective error values to a predetermined error factor; and
    generating an updated ego motion model based on a remaining subset of the samples.

7. The radar sensor system of claim 6, wherein the acts of estimating the respective error values, removing the subset of the samples, and generating the updated ego motion model based on the remaining subset of the samples are repeated a predetermined number of times, and wherein a final updated ego motion model generated for a window is a potential ego motion estimation for the window.

8. The radar sensor system of claim 6, wherein the acts of estimating the respective error values, removing the subset of the samples, and generating the updated ego motion model based on the remaining subset of the samples are repeated until reaching a preset error value, and wherein a final updated ego motion model generated for a window is a potential ego motion estimation for the window.

9. The radar sensor system of claim 1, wherein selecting one of the potential ego motion estimations as the ego motion estimation of the radar sensor system further comprises:
    selecting the ego motion estimation based on numbers of remaining samples upon which updated ego motion models are generated for each of the windows.

10. The radar sensor system of claim 1, wherein the windows are defined within a portion of the concatenated radar frame based on an ego motion estimation for a previous time period.

11. The radar sensor system of claim 1 being included as part of an autonomous vehicle.

12. An autonomous vehicle, comprising:
    a radar sensor system, comprising:
        a transmit antenna configured to transmit a radar signal into an environment of the radar sensor system;
        a receive antenna configured to receive a return signal from the environment of the radar sensor system responsive to the radar signal; and radar processing circuitry that is configured to perform acts comprising:

generating a radar frame based on the return signal received from the environment, the radar frame comprises detection points, each of the detection points having a radial velocity value and an azimuth angle value;

concatenating the radar frame with at least one shifted radar frame to form a concatenated radar frame, the shifted radar frame comprises the detection points of the radar frame having respective radial velocity values shifted by a multiple of an unambiguous maximum velocity value of the radar sensor system;

defining windows within the concatenated radar frame;

selecting respective groups of detection points within the windows identified as likely corresponding to one or more static objects in the environment;

generating potential ego motion estimations based on the groups of detection points within the windows; and selecting one of the potential ego motion estimations as an ego motion estimation of the autonomous vehicle.

13. The autonomous vehicle of claim 12, wherein the windows within the concatenated radar frame are overlapping.

14. The autonomous vehicle of claim 13, wherein a size of an overlap between the windows is based on a maximum velocity of the autonomous vehicle, a maximum azimuth angle value measurable by the radar sensor system, and a maximum elevation angle value measurable by the radar sensor system.

15. The autonomous vehicle of claim 12, wherein selecting the respective groups of detection points within the windows comprises, within each of the windows:

generating single dimension velocity component estimate values for the detection points in the window based on the radial velocity values and the azimuth angle values of the detection points;

separating the detection points into potential groups based on the single dimension velocity component estimate values; and selecting, from the potential groups, a group that includes a maximum number of detection points.

16. The autonomous vehicle of claim 12, wherein generating the potential ego motion estimations based on the groups of detection points within the windows comprises, within each of the windows:

selecting a predefined number of samples from the detection points in the group;

generating an ego motion model based on the samples;

estimating respective error values of the samples based on the ego motion model;

removing a subset of the samples, the subset of the samples being removed by comparing the respective error values to a predetermined error factor; and generating an updated ego motion model based on a remaining subset of the samples.

17. The autonomous vehicle of claim 16, wherein the acts of estimating the respective error values, removing the subset of the samples, and generating the updated ego motion model based on the remaining subset of the samples are repeated, and wherein a final updated ego motion model generated for a window is a potential ego motion estimation for the window.

18. The autonomous vehicle of claim 12, wherein selecting one of the potential ego motion estimations as the ego motion estimation of the autonomous vehicle further comprises:

selecting the ego motion estimation based on numbers of remaining samples upon which updated ego motion models are generated for each of the windows.

19. The autonomous vehicle of claim 12, wherein the windows are defined within a portion of the concatenated radar frame based on an ego motion estimation for a previous time period.

20. A method of estimating ego motion using a radar sensor system, comprising:

generating a radar frame based on a return signal received by the radar sensor system from an environment, the return signal being received responsive to a radar signal transmitted into the environment by the radar sensor system, the radar frame comprises detection points, each of the detection points having a radial velocity value and an azimuth angle value;

concatenating the radar frame with at least one shifted radar frame to form a concatenated radar frame, the shifted radar frame comprises the detection points of the radar frame having respective radial velocity values shifted by a multiple of an unambiguous maximum velocity value of the radar sensor system;

defining windows within the concatenated radar frame;

selecting respective groups of detection points within the windows identified as likely corresponding to one or more static objects in the environment;

generating potential ego motion estimations based on the groups of detection points within the windows; and selecting one of the potential ego motion estimations as an ego motion estimation of the radar sensor system.

\* \* \* \* \*